United States Patent
Jo (10) Patent No.: US 10,672,043 B2
(45) Date of Patent: Jun. 2, 2020

(54) METHOD OF CONFIDENTIALLY OUTPUTTING DELIVERY WAYBILL, SERVER SYSTEM THEREFOR AND AGENT SYSTEM THEREFOR

(71) Applicant: K CLOUD CO., LTD., Seoul (KR)

(72) Inventor: Nam-sub Jo, Seoul (KR)

(73) Assignee: K CLOUD CO., LTD., Seoul (KR)

( * ) Notice: Subject to any disclaimer, the term of this patent is extended or adjusted under 35 U.S.C. 154(b) by 354 days.

(21) Appl. No.: 15/110,259

(22) PCT Filed: Dec. 19, 2014

(86) PCT No.: PCT/KR2014/012573
§ 371 (c)(1),
(2) Date: Jul. 7, 2016

(87) PCT Pub. No.: WO2015/105288
PCT Pub. Date: Jul. 16, 2015

(65) Prior Publication Data
US 2016/0328763 A1 Nov. 10, 2016

(30) Foreign Application Priority Data
Jan. 13, 2014 (KR) ........................ 10-2014-0004078

(51) Int. Cl.
*G06Q 10/08* (2012.01)
*G06Q 30/04* (2012.01)
(Continued)

(52) U.S. Cl.
CPC .......... *G06Q 30/04* (2013.01); *G06F 21/606* (2013.01); *G06F 21/6245* (2013.01); *G06Q 10/08* (2013.01)

(58) Field of Classification Search
CPC .................................................. G06Q 10/083
See application file for complete search history.

(56) References Cited

U.S. PATENT DOCUMENTS 6,973,385 B2 * 12/2005 Ulrich ................. G06Q 10/025
340/572.1
7,359,942 B2 * 4/2008 Mizushima .......... G06Q 10/087
709/206

(Continued)

FOREIGN PATENT DOCUMENTS

KR 10-0743157 B1 7/2007
KR 10-0875520 B1 12/2008
(Continued)

*Primary Examiner* — William J Jacob
(74) *Attorney, Agent, or Firm* — Rabin & Berdo, P.C.

(57) ABSTRACT

In a method of confidentially outputting a delivery waybill, a seller receives an order information including a customer's personal information and transmits the order information to a product provider after removing the personal information. The product provider generates a delivery information and transmits it with a delivery waybill print request to a confidential delivery waybill server. The confidential delivery waybill server generates a combined delivery waybill information by combining the delivery information and logistics information and transmits it with the delivery waybill print request to the confidential delivery waybill agent of the seller. The confidential delivery waybill agent generates a delivery waybill by combining the combined delivery waybill information and the personal information of the customer and transmits the delivery waybill to a printer of the product provider. Finally, the product provider prints the delivery waybill including the personal information of the customer on a document.

3 Claims, 3 Drawing Sheets (51) Int. Cl.
    *G06F 21/60*     (2013.01)
    *G06F 21/62*     (2013.01)

(56) References Cited

U.S. PATENT DOCUMENTS

| | | | |
|---|---|---|---|
| 7,406,440 B2 * | 7/2008 | Napier | G06Q 10/0831 705/24 |
| 7,548,881 B2 * | 6/2009 | Narayan | G06Q 10/063 705/24 |
| 7,725,406 B2 * | 5/2010 | Black | G06Q 10/08 705/331 |
| 8,170,929 B1 * | 5/2012 | Mallon | G06Q 30/06 705/1.1 |
| 2004/0133441 A1 * | 7/2004 | Brady | G06Q 10/08 709/201 |
| 2006/0116893 A1 * | 6/2006 | Carnes | G06Q 10/08 705/333 |
| 2013/0024393 A1 * | 1/2013 | Fleur | G06Q 10/083 705/333 |
| 2013/0138536 A1 * | 5/2013 | Koh | G06Q 30/06 705/26.81 |
| 2014/0032373 A1 * | 1/2014 | Tierney | G06Q 40/02 705/26.81 |
| 2015/0363612 A1 * | 12/2015 | Li | G06F 21/6245 726/26 |

FOREIGN PATENT DOCUMENTS

| | | |
|---|---|---|
| KR | 10-1206473 B1 | 12/2012 |
| KR | 10-1322466 B1 | 10/2013 |

\* cited by examiner

METHOD OF CONFIDENTIALLY OUTPUTTING DELIVERY WAYBILL, SERVER SYSTEM THEREFOR AND AGENT SYSTEM THEREFOR

TECHNICAL FIELD

The present invention relates to a method of confidentially outputting a delivery waybill, a server system therefor and an agent system therefor. More particularly, the present invention provides a method and a system of confidentially outputting a delivery waybill which can prevent a risk of leakage of personal information such as human information of a consignee and more conveniently output a delivery waybill with confidentiality and a server system therefor and an agent system therefor.

BACKGROUND ART

In the online shopping market, customers order products from online sellers such as home shopping and internet shopping, etc. and the online sellers request delivery companies to deliver the ordered products to the customers. On this process, the risk that order information or personal information of the customers will be leaked by the delivery companies, or providers (or manufacturer) of the products other than the online sellers is increased.

Further, responsibilities of a provider which takes charge of a delivery business as well as online sellers have been further increased by reinforcement of a personal information protection related law for protecting the personal information such as the human information of the customer.

In order to solve such a problem, techniques, by which the delivery business can be processed without storing the personal information of the customers in a processing system possessed by the delivery companies and the multiple providers related to the delivery business have been came up.

Figure 1:
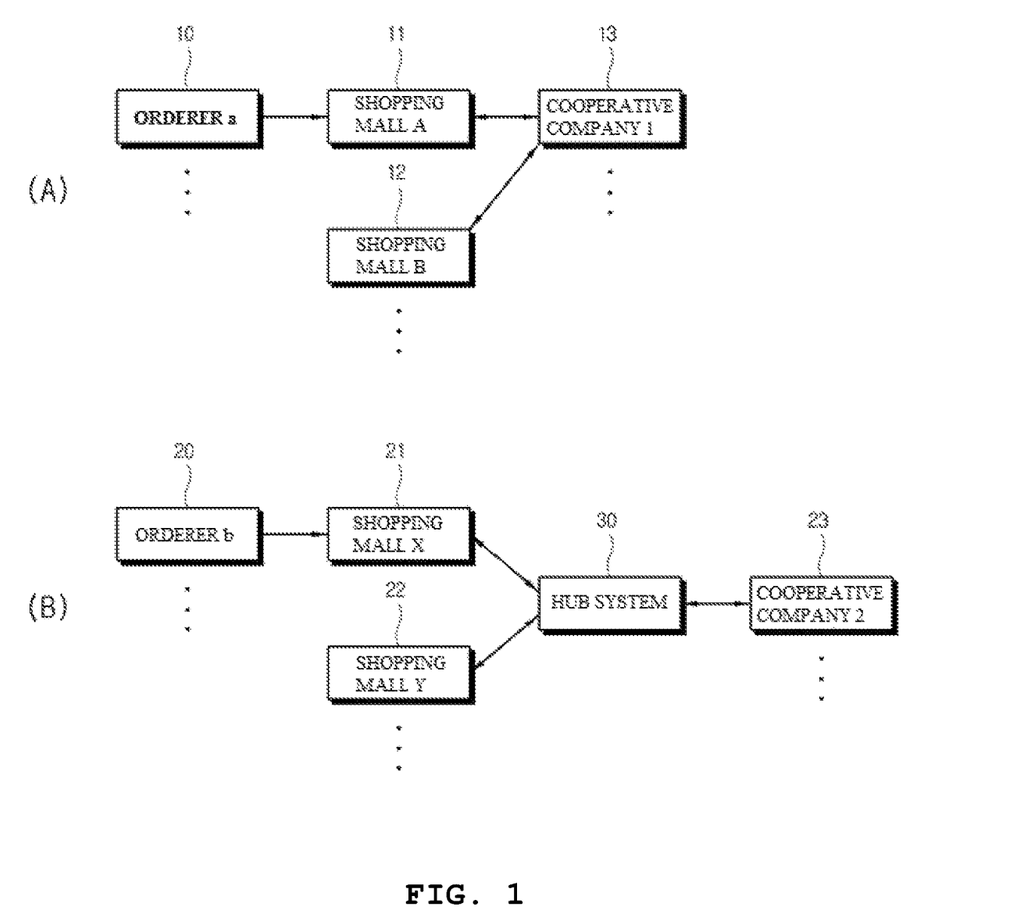
FIG. 1 is a schematic view of an output of a delivery waybill through an online shopping mall in the related art.

As an example, in FIG. 1A, when a customer 10 orders products from respective internet shopping malls 11 and 12, the internet shopping malls 11 and 12 store the personal information of the customer only in their own system for confidentially outputting the delivery waybill. And then, a cooperative company 13 which cooperates with internet shopping malls 11 and 12 in the delivery business, confidentially outputs a delivery waybill of the customer by accessing each system of the internet shopping malls 11 and 12. As another example, in FIG. 1B, when a customer 20 orders products from respective internet shopping malls 21 and 22, the internet shopping malls 21 and 22 store the personal information of the customer in a separated hub system 30 which can be shared with the internet shopping malls 21 and 22 for a confidentially outputting delivery waybill. And then, a cooperative company 23 which cooperates with internet shopping malls 21 and 22 in the delivery business, confidentially outputs a delivery waybill of the customer by accessing the hub system 30.

However, according to the first scheme, since the providers which take charge of the delivery business universally transact with the multiple Internet shopping malls, and the like, it may be inconvenient for the providers to take charge of the delivery business individually access the multiple Internet shopping malls, and the like to confidentially output the delivery waybill.

In addition, according to the second scheme, since the human information of the customer for confidentially outputting the delivery waybill needs to be provided to the hub system in the Internet shopping mall, and the like, there is a risk that the personal information provided by the shopping mall, and the like will leak due to hacking of the hub system, and the like.

As a result, a scheme is required, which the providers which take charge of the delivery business can more conveniently use while keeping a transaction relationship with multiple Internet shopping malls and prevents the human information of the customer from being provided to an independent hub system to prevent mass personal information from being leaked in the Internet shopping malls, and the like.

SUMMARY OF THE INVENTION

The present invention has been made in an effort to provide a method and a system of confidentially outputting a delivery waybill which allow a seller of an online shopping mall, and the like to safely transact based on a confidential delivery waybill which can prevent a risk of leakage of personal information such as human information of a customer and allows a provider which takes charge of a delivery business to more conveniently perform an output business of the confidential delivery waybill.

An exemplary embodiment of the present invention provides a method of outputting a delivery waybill through a confidential delivery waybill server system based on order information of a customer, which includes: providing, by respective sellers, a confidential delivery waybill agent system confidentially processing human information of a consignee included in the order information based on the order information of the customer; providing a confidential delivery waybill server system processing delivery information based on the order information of the customer, which does not include the human information of the consignee; inputting the delivery information associated with at least one seller, which does not include the human information of the consignee into the confidential delivery waybill server system through a user system; requesting outputting a delivery waybill corresponding to the delivery information to the confidential delivery waybill server system through the user system; generating, by the confidential delivery waybill server system, delivery waybill combination information not including the human information of the consignee by combining the input delivery information and at least one logistics delivery information according to the delivery waybill output request; transmitting the delivery waybill output request and the generated delivery waybill combination information from the confidential delivery waybill server system to the confidential delivery waybill agent system managed by the respective sellers; generating, by the confidential delivery waybill agent system, delivery waybill output information for combining the outputting the human information of the consignee corresponding to the delivery waybill combination information and the received delivery waybill combination information and outputting the combined human information of the consignee and delivery waybill combination information onto a document; and transmitting, by the confidential delivery waybill agent system, the delivery waybill output information including the human information of the consignee to an output unit of the user system without passing through the confidential delivery waybill server system.

Herein, the method may further include transmitting the delivery waybill output information to a printer connected to the output unit of the user system.

Herein, the method may further include: generating delivery request information by combining the delivery information and the logistic delivery information; and transmitting the generated delivery request information to a delivery system through the confidential delivery waybill server system.

Herein, the method may further include: encrypting, by the confidential delivery waybill agent system, the human information in the delivery waybill output information; and decoding, by the output unit of the user system, the encrypted human information of the consignee.

Meanwhile, another exemplary embodiment of the present invention provides a confidential delivery waybill server system including: a central processing unit generating, based on delivery information associated with at least one seller, which does not include human information of a consignee in order information of a customer received from a user system, delivery waybill combination information not including the human information of the consignee by combining the delivery information and at least one logistics delivery information; and a communication unit transmitting an output request command of a confidential delivery waybill depending on the delivery information and the generated delivery waybill combination information to a confidential delivery waybill agent system managed by each seller.

Herein, the central processing unit may generate delivery request information by combining the delivery information and the logistics delivery information.

Herein, the communication unit may transmit the generated delivery request information to a delivery system.

Meanwhile, yet another exemplary embodiment of the present invention provides a confidential delivery waybill agent system including: a central processing unit generating, based on delivery waybill combination information obtained by combining delivery information not including human information of a consignee received from an external confidential delivery waybill server system and logistic delivery information, and delivery waybill output request information, delivery waybill output information by combining the delivery information, and the delivery combination information and the human information of the consignee corresponding to the delivery waybill output request information; and a communication unit transmitting the delivery output information including the generated human information of the consignee so as to output a delivery waybill onto a document.

Herein, the central processing unit may obtain the human information of the consignee from order information of a customer, which corresponds to the delivery waybill combination information.

According to the present invention, a seller of an online shopping mall, and the like can safely transact based on a confidential delivery waybill capable of preventing a risk of leakage of personal information such as human information of a customer.

Further, a provider which takes charge of a delivery business can individually perform an output business of the confidential delivery waybill from multiple sellers with more convenience.

DETAILED DESCRIPTION

Hereinafter, exemplary embodiments of the present invention will be described more fully with reference to the accompanying drawings, in which exemplary embodiments of the invention are shown. The present invention can be realized in various different forms, and is not limited to the exemplary embodiments described herein. Accordingly, the drawings and description are to be regarded as illustrative in nature and not restrictive. Like reference numerals designate like elements throughout the specification.

Figure 2:
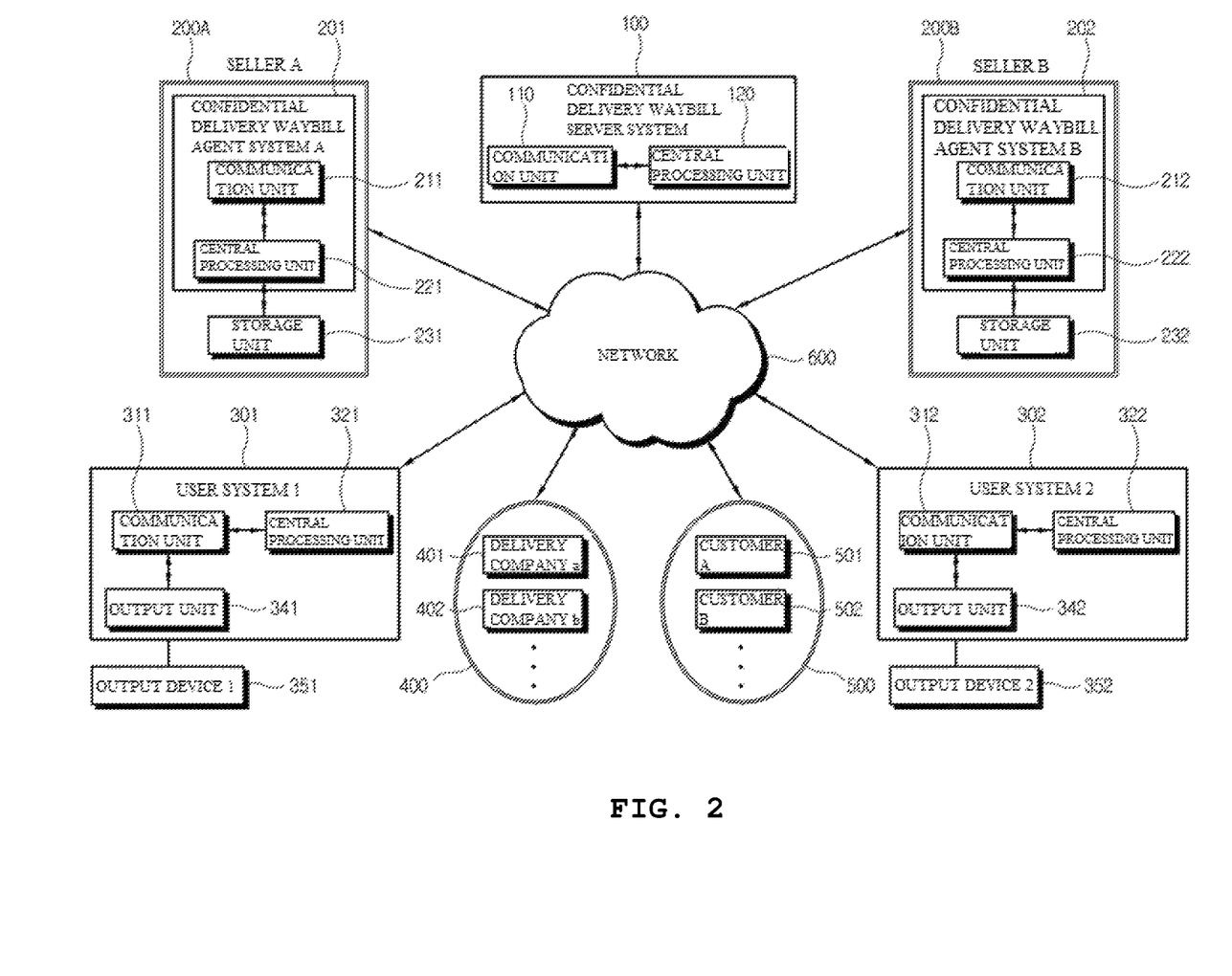
FIG. 2 is an outline view of an overall output system for outputting a delivery waybill through an online shopping mall according to an exemplary embodiment of the preset invention.

FIG. 2 schematically illustrates a configuration of an overall delivery waybill output system for outputting a delivery waybill through an online shopping mall according to an exemplary embodiment of the preset invention.

In the system for outputting a delivery waybill according to the exemplary embodiment of the present invention, delivery information processing for ordering of a product generated from multiple sellers may be integrated and efficiently operated by a simplified confidential delivery waybill server system.

In FIG. 2, the confidential delivery waybill server system 100 is connected with multiple seller systems 200A and 200B, multiple confidential delivery waybill agent systems 201 and 202, multiple user systems 301 and 302, and multiple delivery systems 400; 401 and 402 through a network 600 to perform an online commercial transaction depending on product ordering from multiple customer systems 500.

The network 600 may be provided in a wired scheme and/or wireless scheme. Further, the network 600 is provided as various types of interfaces using broadcasting networks including air channel broadcasting, satellite broadcasting, cable broadcasting, and the like as well as wired Internet, wireless Internet, a satellite network, a wired telephone network, a wireless telephone network, and a mobile telephone network.

Herein, two agents are illustrated in respective seller systems, confidential delivery waybill system, user systems, delivery systems, and customer systems for easy description, but this is exemplary and the number of agents associated with an Internet commercial transaction may be further increased.

Customers may purchase various products on-line through respective seller systems 200A and 200B which are operated in an Internet shopping mall, and the like by using the respective customer systems 500; 501 and 502. Herein, the customer system 500 may be various information processing devices, portable devices, and the like which may transmit/receive images, letters, data, information, and the like through the network in addition to a general personal computer, a notebook computer, a tablet device, a general phone, a mobile phone, a smart phone, and a smart TV.

The respective seller systems 200'200A and 200B may include a system for processing various data, information, and the like, which is operated by multiple different online sellers on the network 600, such as the Internet shopping mall, a home shopping company, a cyber shopping mall, an open market, and the like.

In the seller system according to the exemplary embodiment of the present invention, personal information of the customer which particularly follows the delivery information processing, in particular, human information of a consignee which receives an ordered product ma be possessed only by a system at a seller and transmission of the personal information to the confidential delivery waybill server system is limited to reinforce confidentiality for the personal information. Further, even the human information of an orderer among the personal information of the customer may be processed similarly thereto.

To this end, the respective seller systems 200A and 200B may include the confidential delivery waybill agent systems 201 and 202 for confidential processing of the personal information at the time of delivering the ordered product based on the online commercial transaction.

The user customer system 301 as a system for processing various data, information, and the like possessed by a user which provides the product to various online sellers possessing the seller system may be various information processing devices, portable devices, and the like which may transmit/receive images, letters, data, information, and the like through the network in addition to a general personal computer, a notebook computer, a tablet device, a general phone, a mobile phone, a smart phone, and a smart TV.

Herein, the user may be various manufacturers, manufacturing companies, and venders which provide the products to the online sellers such as the online shopping mall, and the like, various sellers which join in the open market, and the like, and other online sellers which transact with one online seller.

Delivery information which each user inputs in the confidential delivery waybill server system 100 in user systems 1 and 2 301 and 302 may include names of the internet shopping malls as the online sellers, and the like, customer order numbers of the Internet shopping mall as the online seller, and the like, an account of the seller system registered by the user, a collection approximate date of the ordered product, a product name of the order product, the quantity of the ordered products, a price of the ordered product, the quantity of packing boxes for packing the ordered product, a type of the packing box, a delivery charge, a delivery message, and the like.

The delivery information transferred in delivery systems a and b 401 and 402 of respective delivery companies may include a waybill number, delivery zone information, and the like.

Further, the respective delivery systems 401 and 402 as a system for processing various data, information, and the like associated with transactions with various transaction agents through the network 600 may be various information processing devices, portable devices, and the like which may transmit/receive images, letters, data, information, and the like through the network in addition to a general personal computer, a notebook computer, a tablet device, a general phone, a mobile phone, a smart phone, and a smart TV possessed by the respective delivery companies.

According to the exemplary embodiment of the present invention, the confidential delivery waybill server system 100 unificated for transmission and processing of information by multiple transaction agents includes a central processing unit 120 and a communication unit 110.

The central processing unit 120 provided in the confidential delivery waybill server system 100 generates delivery waybill combination information including the human information of the consignee based on the delivery information associated with at least one seller, which does not include the human information of the consignee in the order information of the customer, which is received from the respective user systems 301 and 302 while the product order is received in each of the seller systems 200A and 200 B through the network 600. As a result, the delivery waybill combination information does not include the personal information of the orderer, that is, the human information of the consignee.

Further, the central processing unit 120 provided in the confidential delivery waybill server system 100 obtains at least one logistics delivery information from the delivery systems 401 and 402 used by each delivery company and combines the logistics delivery information with the delivery information to generate the delivery waybill combination information including the human information of the consignee.

The delivery waybill combination information is provided to transfer information required to output the delivery waybill between the confidential delivery waybill server system 100 and the confidential delivery waybill agent systems 201 and 202 provided each seller side.

In addition, the communication unit 110 provided in the confidential delivery waybill server system 100 transmits an output request command of the confidential delivery waybill depending on the delivery information input in the respective user systems 301 and 302 and the delivery waybill combination information generated by the central processing unit 120 to the confidential delivery waybill agent system managed by each seller.

Meanwhile, the central processing unit 120 provided in the confidential delivery waybill server system 100 may generate delivery request information by combining the delivery information input in the respective user systems 301 and 302 and the logistics delivery information obtained by the respective delivery systems 401 and 402. As a result, the communication unit 110 may transmit the generated delivery request information to the respective systems 401 and 402.

In addition, according to the exemplary embodiment of the present invention, the confidential delivery waybill agent systems 201 and 202 provided at each seller side may be provided to have common configurations including central processing units 221 and 222 and communication units 211 and 212, respectively. The respective confidential delivery waybill agent systems 201 and 202 may be provided as components which pertain to the seller systems 200A and 200B at each seller side and provided as independent components to be provided to be integratedly managed by each seller unlike this.

The central processing unit 221 in confidential delivery waybill agent system A 201 is configured to generate delivery waybill output information by combining the delivery information and the delivery waybill combination information and the personal information of the customer corresponding to the delivery waybill output request information, in particular, the human information of the consignee, based on the delivery waybill combination information in which the delivery information not including the personal information of the customer, which is received from an external confidential delivery waybill server system 100 connected through the network 600, in particular, the human information of the consignee and the logistics delivery information, and the delivery waybill output request information. Such configuration is similar even to the central processing unit 222 of the other confidential delivery waybill agent system B 202.

As a result, the delivery waybill output information is transmitted to output units 341 and 342 of the respective user systems 301 and 302 to be output while being displayed on a document.

Herein, the delivery waybill output information is encrypted by the central processing units 211 and 212 of the respective confidential delivery waybill agent systems 201 and 202 or as necessary, the personal information of the customer, in particular, the human information of the consignee is encrypted and other order information may be configured to be generated while not encrypted.

Further, the communication unit 211 provided in confidential delivery waybill agent system A 201 is configured to transmit the delivery waybill output information including the personal information of the customer, in particular, the human information of the consignee, which is generated as above to the output units 341 and 342 of the respective user systems 301 and 302 through the network 600 so as to output the delivery waybill onto the document and such a configuration is similar even to the communication unit 212 of the other confidential delivery waybill agent system B 202.

In addition, the respective central processing unit s221 and 222 of the respective confidential delivery waybill combination information may be configured to obtain the personal information of the customer, in particular, the human information of the consignee from the order information of the customer, which corresponds to the delivery waybill combination information.

In this case, the order information of the customer may be just transmitted through the communication units 211 and 212 of the respective confidential delivery waybill agent systems 201 and 202 in the respective seller systems 200A and 200B or only the personal information of the customer, in particular, the human information of the consignee may be separately transmitted.

In the case of the human information of the consignee, which is obtained by the central processing units 221 and 222 provided in the respective confidential delivery waybill agent systems 201 and 202, the personal information of the customer, in particular, the human information of the consignee is stored in storage units 231 and 232 of the seller system or a storage unit (not illustrated) in the respective agent systems 201 and 202 to be separately maintained and managed and provided to correspond to the delivery waybill combination information generated by the central processing unit 120 of the confidential delivery waybill server system 100 as described above.

The respective user systems 301 and 302 include communication units 311 and 312, central processing units 321 and 322, and output units 341 and 342.

The respective user systems 301 and 302 transmits and receives various data, information, and the like which are associated for the delivery waybill output required for the delivery processing depending on the order information of the customer to and from the confidential delivery waybill system 100, the confidential delivery waybill agent systems 201 and 202, and the seller systems 200A and 200B connected through the network 600, through the communication units 311 and 312 provided in the respective user systems 301 and 302/

In addition, the central processing units 321 and 322 provided in the respective user systems 301 and 302 are configured to input the delivery information associated with at least one seller provided in at least one seller system 200A or 200B, which does not include the personal information of the customer, in particular, the human information of the consignee into the confidential delivery waybill server system 100.

Further, the central processing units 321 and 322 provided in the respective user systems 301 and 302 are configured to request the output of the delivery waybill corresponding to the delivery information to the confidential delivery waybill server system 100.

In addition, the output units 341 and 342 provided in the respective user systems 301 and 302 are configured to receive the delivery waybill output information including the personal information of the customer, in particular, the human information of the consignee as described above from the confidential delivery waybill agent systems 201 and 202 through the respective communication units 311 and 312.

Herein, the output units 341 and 342 of the respective user systems 301 and 302 may be configured to decode the delivery waybill output information encrypted and transmitted from the respective confidential delivery waybill agent systems 201 and 202 or the delivery waybill output information transmitted while the personal information of the customer, in particular, the human information of the consignee is encrypted and other order information is not encrypted as necessary to be displayed on the document.

In addition, output devices 351 and 352 such as a printer for document output may be directly connected to the output units 341 and 342 provided in the respective user systems 301 and 302.

Meanwhile, throughout the present specification, the delivery request information may include a delivery account of each user, a name of each user, a release address, a transmission date, request division such as general/returning, a collection approximate date, a delivery waybill number, a zip code of the consignee, a product name of the ordered product, the quantity of packing boxes for the ordered product, a type of the packing box, a delivery charge, a delivery message, and the like.

In addition, the delivery waybill combination information not including the human information of the consignee may include the product name of the ordered product, the quantity of the ordered products, a price, a delivery waybill number, a delivery charge, the delivery message, a collection branch code, a collection branch name, a collection date, a destination terminal code, a destination terminal name, a delivery address abbreviation, delivery waybill format information, and the like.

Moreover, the delivery waybill output information including the human information of the consignee may include a name of the consignee, a phone number of the consignee, an address of the consignee, the product name of the ordered product, the quantity of the ordered products, the price, the delivery waybill number, the delivery charge, the delivery message, the collection branch code, the collection branch name, the collection date, the destination terminal code, the destination terminal name, the delivery address abbreviation, the delivery waybill format information, and the like.

Figure 3:
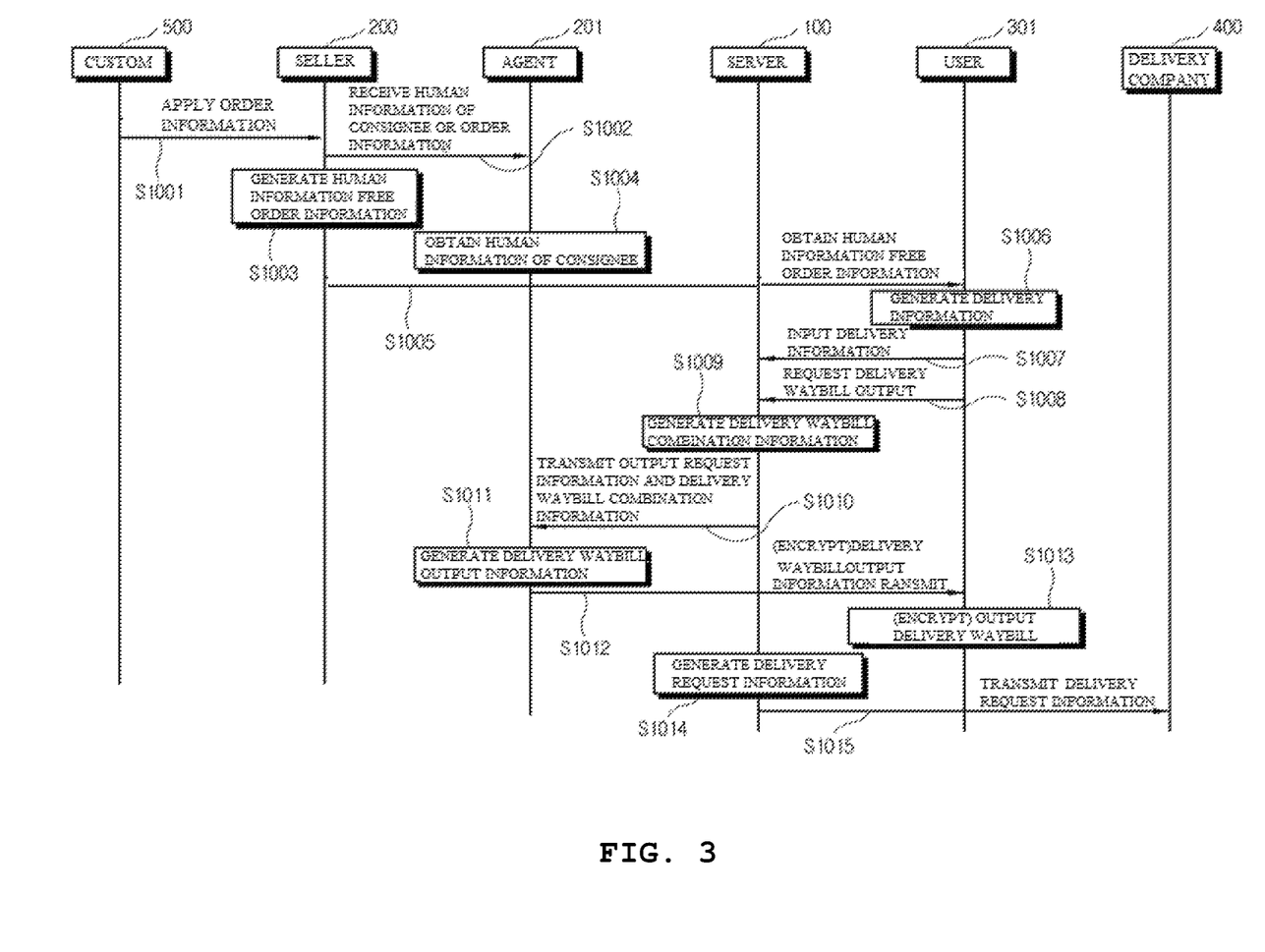
FIG. 3 is a processing flowchart for outputting a delivery waybill through an online shopping mall according to an exemplary embodiment of the preset invention.

FIG. 3 is a processing flowchart for outputting a delivery waybill through an online shopping mall according to an exemplary embodiment of the preset invention.

In respective steps described below, input, output, transmission, obtaining, and processing, and the like of associated data and information may be performed by using the confidential delivery waybill server system 100, the respective confidential delivery waybill agent systems 201 and 202, the respective communications 110;211 212;311 and 312 provided in the respective user systems 301 and 302, the respective central processing units 120; 221 and 222;321 and 322, the storage units 231 and 232, the output units 341 and 342, and the output devices 351 and 352 and may be described within a limit required for description while reducing repeated description of the same contents.

First, the customer applies an order for a desired product to the seller systems 200;200A and 200B of a seller possessing the desired product the network 600 by using the customer systems 500; 501 and 502 possessed thereby (S1001).

In this case, the order information including the ordered product of the customer and the personal information required for the order processing is provided to the respective seller systems 200; 200A and 200B. Herein, the order information may be provided through various means including a fax, an e-mail, a message, a wired/wireless phone, a website, and the like.

Meanwhile, in the respective seller systems 200; 200A and 200B, since the confidential delivery waybill agent systems 201 and 202 are provided, a separate information protection procedure may be performed in order to maintain the personal information of the customer, in particular, the human information of the consignee.

That is, the respective seller systems 200; 200A and 200B may just transmit the order information of the customer to the respective confidential delivery waybill agent systems 201 and 202 or separately transmit only the personal information of the customer, in particular, the human information of the consignee (S1002).

As a result, the respective confidential delivery waybill agent systems 201 and 202 may obtain the personal information of the customer of which confidentiality needs to be maintained, in particular the human information of the consignee from the order information of the customer or the personal information of the customer, in particular, the human information of the consignee which is transmitted (S1004).

In the case of the personal information of the customer, in particular, the human information of the consignee obtained as above, the personal information of the customer, in particular, the human information of the consignee may be separately maintained and managed in the respective confidential delivery waybill agent systems 201 and 202 and is provided to correspond to the delivery waybill combination information generated by the confidential delivery waybill server system 100 as described below.

Meanwhile, the respective sellers generate the order information not including the personal information of the customer, in particular, the human information of the consignee based on the order information by the seller systems 200; 200A and 200B (S1003).

Human information free order information generated not to include the personal information of the customer, in particular, the human information of the consignee is provided to the user systems 301 and 302 of the respective users possessing the corresponding ordered product to allow the respective user systems 301 and 302 to obtain the corresponding information, for the delivery processing for the ordered product (S1005). In this case, the human information free order information may be provided through various means including the fax, the e-mail, the message, the wired/wireless phone, the website, and the like.

As a result, the respective user systems 301 and 302 generate the delivery information according to the order from each customer based on the human information free order information (S1006) and the respective users input the generated delivery information into the confidential delivery waybill server system 100 in the user systems 301 and 302. Herein, various information such as a matter associated with at least one seller included in the delivery information is described as above and the delivery information does not include the personal information of the customer, in particular, the human information of the consignee, of course.

Further, the respective user systems 301 and 302 request the delivery waybill output to the confidential delivery waybill server system 100 in order to output the delivery waybill required for the delivery in response to the generated delivery information (S1008). Since the delivery waybill output request does not include the personal information of the customer, in particular, the human information of the consignee, since it is impossible to deliver the product to a destination desired by the customer only the delivery information, the delivery waybill output request is used for performing a procedure capable of displaying the personal information of the customer, in particular, the human information of the consignee on the delivery waybill.

According to the delivery waybill output request transmitted from the respective user systems 301 and 302, the confidential delivery waybill server system 100 generates the delivery waybill combination information not including the personal information of the customer, in particular, the human information of the consignee by combining the input delivery information and at least one logistics delivery information provided by the delivery system 400 of each delivery company (S1009).

Herein, each delivery company may be selected by each seller and/or each user and as necessary, may be provided for each customer to select.

Further, the logistics delivery information may include the delivery waybill number, and the like required for outputting the delivery waybill provided by each delivery company and be provided to the confidential delivery waybill server system 100 in the delivery systems 401 and 402 of each delivery company. In this case, the corresponding logistics delivery information may be provided via each seller or each user which may select each delivery company.

Thereafter, the confidential delivery waybill server system 100 transmits the information based on the input delivery waybill output request and the deliver waybill combination information to the confidential delivery waybill agent systems 201 and 202 (S1010) to allow the confidential delivery waybill agent systems 201 and 202 to perform the procedure capable of displaying the personal information of the customer, in particular, the human information of the consignee on the delivery waybill.

As a result, the confidential delivery waybill agent systems 201 and 202 provided at the respective seller systems 200; 200A and 200B obtains the personal information of the customer, in particular, the human information of the consignee corresponding to the delivery waybill combination information as described in step S1004 and combines the obtained human information of the consignee with the delivery waybill combination information received by the confidential delivery waybill server system 100 to generate the deliver waybill output information to be output on the document (S1011).

In the confidential delivery waybill agent systems provided at each seller side, the personal information of the customer, in particular, the human information of the consignee which may be displayed in the delivery waybill is at last generated as the delivery waybill output information and securely maintains the confidentiality without being exposed to neither of the confidential delivery waybill server system, the user system, or the delivery system.

The delivery waybill output information generated by the respective confidential delivery waybill agent systems 201 and 202 is directly transmitted to the user systems 301 and 302 of the respective users (S1012) and in this case, since the delivery waybill output information does not go via the confidential deliver waybill server system 100, a leakage risk of the personal information which may be shown when using the hub system in the related art may be completely excluded.

That is, in respect with the delivery waybill output request transmitted to the confidential delivery waybill server system 100 in the respective user systems 301 and 302, the corresponding server system 100 generates the delivery waybill combination information required for the delivery waybill output request and just transmits the generated delivery waybill combination information to the respective agent systems 201 and 202 of the respective sellers and a so called redirection scheme is adopted, in which the respective agent systems 201 and 202 directly transmit the corresponding delivery waybill output information to the respective user systems 301 and 302 which request the delivery waybill without going via the server system 100 in respect to the output request information transmitted by the server system.

Further, the delivery waybill output information is transmitted to output units 341 and 342 of the respective user systems 301 and 302 to be output while being displayed on the document. Herein, the output devices 351 and 352 such as the printer for the document output may be directly connected to the output units 341 and 342.

Herein, the delivery waybill output information is encrypted or as necessary, the personal information of the customer, in particular, the human information of the consignee and other order information may be transmitted to the respective output units 341 and 342 while the personal information of the customer, in particular, the human information of the consignee is encrypted and other order information is not encrypted.

As a result, the output units 341 and 342 of the respective user systems may output the delivery waybill (S1013) and when the delivery waybill is output on the document, the personal information of the customer, in particular, the human information of the consignee is at least displayed on the document together with the remaining order information.

In this case, in the respective output units 341 and 342, a process of decoding the deliver waybill output information which is encrypted and transmitted to be displayed on the document may be performed.

Meanwhile, the confidential delivery waybill server system 100 may generate the delivery request information by combining the delivery information provided by the respective user systems 301 and 302 and the logistics delivery information provided from the respective delivery systems 400, 401, and 402 (S1014) and the generated delivery request information may be transmitted from the confidential delivery waybill server system 100 to the respective delivery systems 400, 401, and 402 (S1015).

As a result, each delivery company performs a process of delivering the ordered product of which the delivery waybill output is completed to respective destinations in the respective user systems 301 and 301 according to the delivery request information transmitted to the delivery systems 400; 401 and 402.

The exemplary embodiments of the present invention described above can be implemented through the apparatus and the method and can be implemented through a computer program which realizes a function corresponding to a configuration of the exemplary embodiments of the present invention or a recording medium having the computer program recorded therein.

Although some exemplary embodiments of the present invention have been illustrated and described, those skilled in the art can know that improvement or modification of the exemplary embodiment can be made without departing from the principle or spirit of the present invention. The scope of the present invention will be determined based on the appended claims and equivalents thereto.

What is claimed is:

1. A method of outputting a delivery waybill through a confidential delivery waybill server system, the method comprising:

receiving, by a seller terminal, a first order information from a customer via a network, wherein the first order information includes personal information of the customer, wherein the seller terminal has stored therein product information of a product provided by a product provider, the product selected by the customer to generate the first order information;

providing, by the seller terminal, the first order information to a confidential delivery waybill agent included in the seller terminal;

generating, by the seller terminal, a second order information by removing the personal information of the customer from the first order information;

transmitting, by the seller terminal via the network, the second order information having the personal information removed to a product provider terminal operated by the product provider;

generating, by the product provider terminal, delivery information associated with the second order information, and transmitting the delivery information to a confidential delivery waybill server, wherein the delivery information does not include the personal information of the customer;

sending, by the product provider terminal, a delivery waybill output request to the confidential delivery waybill server;

generating, by the confidential delivery waybill server, combined delivery waybill information by combining the delivery information and logistics information;

transmitting, by the confidential delivery waybill server, the combined delivery waybill information, including the delivery information and the logistics information, to the confidential delivery waybill agent, and sending, by the confidential delivery waybill server, the delivery waybill output request to the confidential delivery waybill agent;

generating, by the confidential delivery waybill agent included in the seller terminal, a delivery waybill-output information by combining the combined delivery waybill information and the personal information of the customer;

transmitting, by the confidential delivery waybill agent and via the network, the delivery waybill-output information including the personal information of the customer directly to a printer connected to the product provider terminal, wherein the delivery waybill output information including the personal information of the customer is not transmitted to the product provider terminal;

printing, by the printer, the delivery waybill output information including the personal information of the customer on a document;

generating, by the confidential delivery waybill server, delivery request information by combining the delivery information and the logistics information; and transmitting, by the confidential delivery waybill server, the delivery request information to a logistics company terminal, wherein the seller terminal, the product provider terminal and the confidential delivery waybill server are separately connected to each other over the network, wherein the delivery information includes one or more of a name of an online seller controlling the seller terminal, a product name of the product selected by the customer, a price of the product selected by the customer, and a delivery charge, and wherein the logistics information includes a delivery waybill number associated with a delivery company.

2. The method of claim 1, the method further comprising:

encrypting, by the confidential delivery waybill agent, the personal information of the customer included in the delivery waybill; and decoding, by the product provider terminal, the personal information of the customer encrypted by the confidential delivery waybill agent.

3. A method of outputting a delivery waybill through a confidential delivery waybill server system, the method comprising:

receiving, by a seller terminal, a first order information from a customer via a network, wherein the first order information includes personal information of the customer, wherein the seller terminal has stored therein product information of a product provided by a product provider, the product selected by the customer to generate the first order information;

providing, by the seller terminal, the first order information to a confidential delivery waybill agent included in the seller terminal;

generating, by the seller terminal, a second order information by removing the personal information of the customer from the first order information;

transmitting, by the seller terminal via the network, the second order information having the personal information removed to a product provider terminal operated by the product provider;

generating, by the product provider terminal, delivery information associated with the second order information, and transmitting the delivery information to a confidential delivery waybill server, wherein the delivery information does not include the personal information of the customer;

sending, by the product provider terminal, a delivery waybill output request to the confidential delivery waybill server;

generating, by the confidential delivery waybill server, combined delivery waybill information by combining the delivery information and logistics information;

transmitting, by the confidential delivery waybill server, the combined delivery waybill information, including the delivery information and the logistics information, to the confidential delivery waybill agent, and sending, by the confidential delivery waybill server, the delivery waybill output request to the confidential delivery waybill agent;

generating, by the confidential delivery waybill agent included in the seller terminal, a delivery waybill-output information by combining the combined delivery waybill information and the personal information of the customer;

transmitting, by the confidential delivery waybill agent and via the network, the delivery waybill-output information including the personal information of the customer directly to a printer connected to the product provider terminal, wherein the delivery waybill output information including the personal information of the customer is not transmitted to the product provider terminal; and printing, by the printer, the delivery waybill output information including the personal information of the customer on a document, wherein the seller terminal, the product provider terminal and the confidential delivery waybill server are separately connected to each other over the network, wherein the delivery information includes one or more of a name of an online seller controlling the seller terminal, a product name of the product selected by the customer, a price of the product selected by the customer, and a delivery charge, wherein the logistics information includes a delivery waybill number associated with a delivery company, wherein generating the delivery waybill output information includes encrypting, by the confidential delivery waybill agent, the personal information of the customer included in the delivery waybill, and wherein the product provider terminal decodes the personal information of the customer encrypted by the confidential delivery waybill agent.

* * * * *